United States Patent [19]

Branz et al.

[11] Patent Number: 5,377,037

[45] Date of Patent: Dec. 27, 1994

[54] ELECTROCHROMIC-PHOTOVOLTAIC FILM FOR LIGHT-SENSITIVE CONTROL OF OPTICAL TRANSMITTANCE

[75] Inventors: Howard M. Branz, Boulder; Richard S. Crandall; C. Edwin Tracy, both of Golden, all of Colo.

[73] Assignee: Midwest Research Institute, Kansas City, Mo.

[21] Appl. No.: 973,171

[22] Filed: Nov. 6, 1992

[51] Int. Cl.[5] ............... G02F 1/15; G02F 1/153; G02C 7/16
[52] U.S. Cl. .................. 359/265; 359/267; 359/273; 351/45
[58] Field of Search ............ 351/41, 44, 45; 359/265, 273, 275, 267, 315, 321, 322

[56] References Cited

U.S. PATENT DOCUMENTS

| | | | |
|---|---|---|---|
| 4,006,966 | 2/1977 | Meyers et al. | 359/275 |
| 4,279,474 | 7/1981 | Belgorod | 359/41 |
| 4,281,208 | 7/1981 | Kuwano et al. | 136/249 |
| 4,338,000 | 7/1982 | Kamimori et al. | 359/265 |
| 4,531,814 | 7/1985 | Ballmer | 359/275 |
| 4,958,917 | 9/1990 | Hashimoto et al. | 359/275 |
| 4,959,257 | 9/1990 | Mukherjee | 428/156 |
| 4,968,127 | 11/1990 | Russell et al. | 351/44 |
| 4,991,951 | 2/1991 | Mizuno et al. | 351/41 |
| 5,015,086 | 5/1991 | Okaue et al. | 351/44 |
| 5,042,923 | 8/1991 | Wolf et al. | 359/275 |
| 5,067,795 | 11/1991 | Senatore | 359/84 |
| 5,097,358 | 3/1992 | Ito et al. | 359/273 |

*Primary Examiner*—Loha Ben
*Assistant Examiner*—Darryl J. Collins
*Attorney, Agent, or Firm*—Ken Richardson; Edna M. O'Connor

[57] ABSTRACT

A variable transmittance optical component includes an electrochromic material and a photovoltaic device-type thin film solar cell deposited in a tandem type, monolithic single coating over the component. A bleed resistor of a predetermined value is connected in series across the electrochromic material and photovoltaic device controlling the activation and deactivation of the electrochromic material. The electrical conductivity between the electrochromic material and the photovoltaic device is enhanced by interposing a transparent electrically conductive layer.

19 Claims, 4 Drawing Sheets

ELECTROCHROMIC-PHOTOVOLTAIC FILM FOR LIGHT-SENSITIVE CONTROL OF OPTICAL TRANSMITTANCE

CONTRACTUAL ORIGIN OF THE INVENTION

The United States Government has rights in this invention under Contract No. DE-AC02-83CH10093 between the U.S. Department of Energy and the National Renewable Energy Laboratory, a Division of Midwest Research Institute.

BACKGROUND OF THE INVENTION

1. Field of the Invention

The present invention relates to optical transmitting components, and more particularly to an apparatus for varying the light transmittance of optical components.

2. Description of the State of the Art

It is known to use an electrochromic (EC) device or liquid nematic crystals (LC) to control the transmittance of light through optical transmitting components. These materials have been widely applied to building and automobile windows largely due to the existence of convenient external power supplies which are necessary to change the translucence of the EC or LC material.

Portable optical transmitting devices with variable light absorption require self-contained power sources or materials that react directly to ambient light levels so that movement is not restricted by connection to a stationary power supply. Examples of such an optical transmitting device that utilize variable absorptance and non-restricted movement can be found in the eyewear field. Presently, the most common lens, which allows for both variable light absorption and mobility, is constructed with photochromic glass (also called phototropic or identified under the trademark PHOTOGRAY TM). A disadvantage of photochromic glass is that it can not be used in conjunction with plastic lenses. Photochromic glass includes a light-sensitive chemical structure which chemically darkens upon exposure to ambient light, but regains its original transparency over a period of time after the light is removed. Photochromic glasses, however, have the further disadvantage of a relatively slow response time. Full darkening requires approximately 5 minutes, while approximately 60 seconds is necessary to darken to 75% of the maximum density. A greater disadvantage is that recovery to the initial transparency is an even slower process. To achieve a 50% recovery, five minutes is required, while a 75% recovery requires twenty minutes.

Such slow response time required by photochromic glass is inadequate for use in eyewear, because the sight of an individual may be severely hampered when entering a dark area from an area of high intensity lighting. Also, since light in the ultraviolet (UV) spectrum causes the chemical reaction that varies light absorption in photochromic devices, the reaction is severely hampered by other glazing that blocks UV light, such as automobile windshields, energy efficient windows, and the like, that have been coated with UV absorbing coatings.

There have been some apparati and methods developed for controlling the transmittance of light through optical transmitting devices which operate with self-contained power sources. For example, U.S. Pat. No. 4,279,474 to Belgorod discloses a spectacle lens comprising a liquid crystal layer and electrode assembly sandwiched between a pair of glass lenses. A battery supplying a voltage across the electrodes is responsible for varying the optical density of the lens. The Russell et al. patent, U.S. Pat. No. 4,968,127 discloses eyewear comprising a pair of lenses having a liquid crystal layer therebetween, a power supply, and a control circuit having a phototransistor for sensing ambient light. The power source utilized by Russell et al., is a photocell array distributed about the periphery of the eyeglass frame. Okaue et al., in his U.S. Pat. No. 5,015,086 discloses electronic sunglasses having variable transmittance employing liquid crystal material and a solar cell as a power source.

The Ballmer patent, U.S. Pat. No. 4,531,814 discloses the use of an electrochromic material coating applied to optical transmitting components in combination with a battery and electric control circuit for increasing and decreasing the absorptance of the component.

Belgorod, Russell and Okaue teach the use of an optical transmitting device with variable absorbance having a self-contained power supply in combination with liquid nematic crystals. A disadvantage of liquid nematic crystal technology is that a constant source of energy is required to change the translucence of the lens, thus requiring a substantial and continuous source of electrical power as long as translucence instead of transparency is desired. The photocell arrays utilized by Russell and Okaue also have a further disadvantage of not being aesthetically pleasing or practical for all types of eyeware frame designs.

While Ballmer teaches the use of electrochromic coatings for controlling the transmittance of light through optical components his device, to be operational, requires an external battery for a current supply to be attached to the optical component.

SUMMARY OF THE INVENTION

Accordingly, it is a general object of this invention to provide a variable transmittance optical component that does not require an external power supply.

A more specific object of the present invention is to provide a variable transmittance optical component having an integral power source, light sensor and color change material, in a tandem type, monolithic single coating over the component which is easily fabricated.

Another specific object of the present invention is to provide a variable transmittance optical component that can be activated and deactivated with the consumption of power, produced by an integral power source, but without requiring external power to maintain it in either state after a transition from one state to the other.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the apparatus of this invention may comprise a piece of glass plastic or other transparent substrate having deposited on it a transparent photovoltaic cell in conjunction with a coating of electrochromic material. This coating may also be connected in parallel to a battery to decrease the rate at which the optical component darkens.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

In the drawings

DETAILED DESCRIPTION OF THE PREFERRED EMBODIMENT

Figure 2:
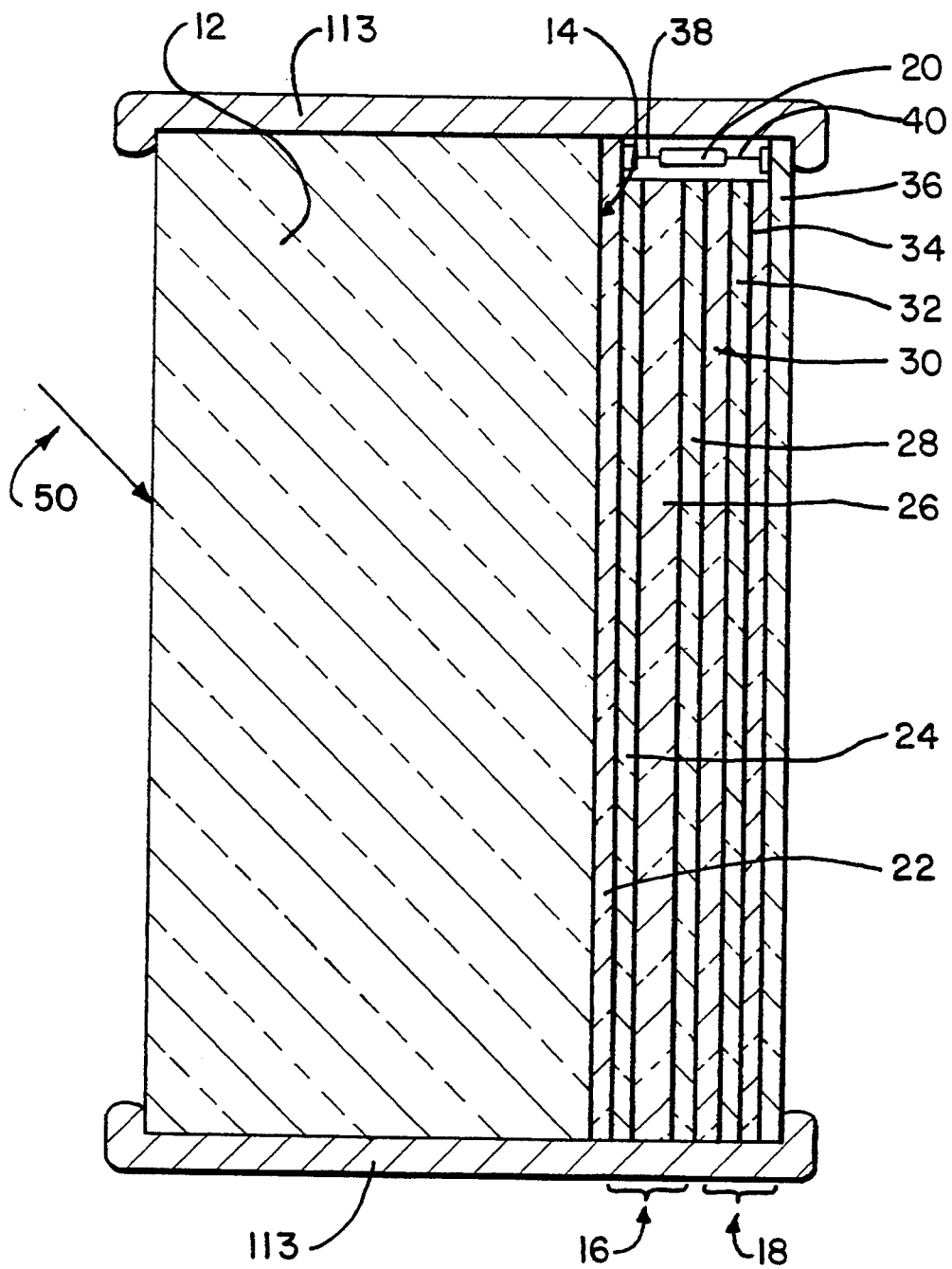
FIG. 2 is a cross-sectional view taken along line 2—2 of FIG. 1 showing a first embodiment electrochromic-photovoltaic film deposited on an optical transmittance component.

The electrochromic-photovoltaic (EC-PV) film 10 assembly according to the present invention is best seen in FIG. 2. The EC-PV assembly 10 is comprised of a lens or plate 12 of glass or other transparent substrate. Deposited upon the surface 14 of glass lens 12 is a thin-film solar cell or PV device 16 and an electrochromic (EC) device or assembly 18. The PV device 16 and electrochromic device 18 are connected in series via bleeder resistor 20, of a predetermined value, whereby under bright light conditions the electrochromic layer is activated by electrical energy from the PV device 16 assuming a substantially opaque state, and whereby a darkening of light conditions will inactivate the PV device 16 thereby discharging the current from the electrochromic layer through bleeder resistor 20 resulting in a bleaching of the electrochromic layer. As discussed in detail below the EC-PV assembly 10 of the present invention comprises the deposition of an electrochromic device 18 and a PV device 16 upon one another in a tandem configuration. The order in which EC device 18 and PV device 16 are deposited upon lens 12 is not critical to the functioning of the present invention. Disclosed below, PV device 16 is deposited upon lens 12 followed by the deposition of EC device 18, however, this is not to be viewed as a limiting factor, in that the configuration of the EC-PV assembly 10 could also comprise depositing the EC device 18 upon lens 12 followed by the deposition of PV device 16. In all cases the device must be used in such a way so that the incident light 50 passes through the PV device 16 before reaching the EC device 18.

Referring now primarily to FIG. 2, the electrochromic-photovoltaic film assembly 10 according to the present invention includes the tandem deposition of a PV device-type thin-film solar cell 16 of a type well known in the art, and an electrochromic device 18 upon the surface 14 of glass lens 12 or other transparent substrate by way of physical vapor deposition, sputtering, chemical vapor deposition, i.e., heat stimulated or radio frequency discharge or the like. In accordance with standard practice, the first layer deposited on surface 14 is a transparent electrically conductive (TE) layer 22. A transparent electrically conductive layer may be made of highly doped metal oxides, such as tin oxide, zinc oxide, indium oxide, or mixtures thereof, or in the alternative the TE layer may be made of thin transparent metals such as, Au, Ag or Cu, however the use of thin transparent metals does not optimize transparency. This TE layer 22 can be about 5,000 to 10,000 angstroms thick. A p-type hydrogenated amorphous silicon carbide (a-SiC:H(p)) or p-type microcrystalline silicon layer 24, of about 30 to 200 angstroms thick, is then deposited upon TE layer 22 followed by an a-SiC:H(i) or undoped layer 26 on the order of 500 to 2,000 angstroms thick. Finally, a layer of phosphorous-doped a-SiC:H(n) layer 28 or an n-type conductivity region of about 30 to 200 angstroms thick is deposited. This PV device 16 can be produced using other hydrogenated amorphous silicon alloy materials, however, the addition of carbon increases the band gap thus increasing the corresponding transparency of the PV device 16.

An EC device 18, composed of several component coatings, is next deposited over the PV device 16, specifically over the a-SiC:H(n) layer 28, as shown in FIG. 2. An electrochromic device is composed of several component coatings or layers, including transparent electrically conductive layer (TE) 36, which functions as an electrode, an electrochromic layer 30, an ion-conductive-electrolyte layer 32, and an ion storage layer 34 or counter-electrode layer.

Generally, the EC device 18 can be deposited one layer at a time utilizing the same deposition technique used in depositing the PV device 16. The first layer of EC device 18 deposited, upon the a-SIC:H(n) layer 28, is an electrochromic layer 30. An electrochromic material is one that takes on or losses color, i.e., becomes opaque or transparent, in response to an electric potential or current therethrough. Electrochromic materials can be anodic or cathodic in nature. Cathodic-type materials such as $WO_3$, $MoO_3$, $TiO_2$, $U_2O_5$, $Bi_2O_3$, $PbO_2$, and $CuO_x$ reduce and take on color in response to ion insertion, which can be induced by a DC electric current. This EC layer 30 is normally chosen to be a cathodic material, and can be about 1,000 to 15,000 angstroms thick. An ion-conductive electrolyte layer 32 can then be deposited on the EC layer 30. Electrolyte layer 32 may be a liquid, a polymer gel, or a solid film. For most applications, the liquid electrolyte is not practical. Polymer gels in which the polymer acts like a sponge to hold the liquid electrolyte may be practical when the polymer gel is also used as the bonding layer between two sheets of glass or two sheets of plastic onto which the other layers have been deposited. Typical polymer gels are made of polyethylene-oxide, polypropylene oxide or a silicone imbibed with a lithium salt solution such as lithium perchlorate dissolved in propylene carbonate. Solid thin-film electrolytes are made of so-called fast-ion conductor materials in which either lithium or hydrogen ions diffuse readily. Examples of such fast-ion conductor materials include $Li_3N$, $Li_2NH$, and $Li_{1-x}M_xTi_{2-x}(PO_4)_3$, where M represents another metal, such as aluminum, chromium, gallium, or the like. A solid thin-film electrolyte layer 32 may be, for example, 500 to 10,000 angstroms thick. Next, the ion storage or counter-electrode layer 34 is deposited on the electrolyte layer 32. The materials used in counter-electrode layer 34 can be a complementary electrochromic material or anodic-type materials which oxidize and take on color in response to ion extraction. The function of the counter-electrode layer 34 is merely to store ions which are inserted or retrieved from the EC layer 30. This counter-electrode layer is often chosen to be an anodic electrochromic material such as Prussian blue, Ni(OH)$_2$, IrO$_2$, and CuO$_x$. This ion storage layer 34 can be about 1,000 to 15,000 angstroms thick. Finally, the second transparent electrically conductive layer 36 is deposited for the second electrode, thus completing the EC-PV assembly 10 by sandwiching the EC device 18 and the PV device 16 in tandem between TE layers 22 and 36.

Figure 3:
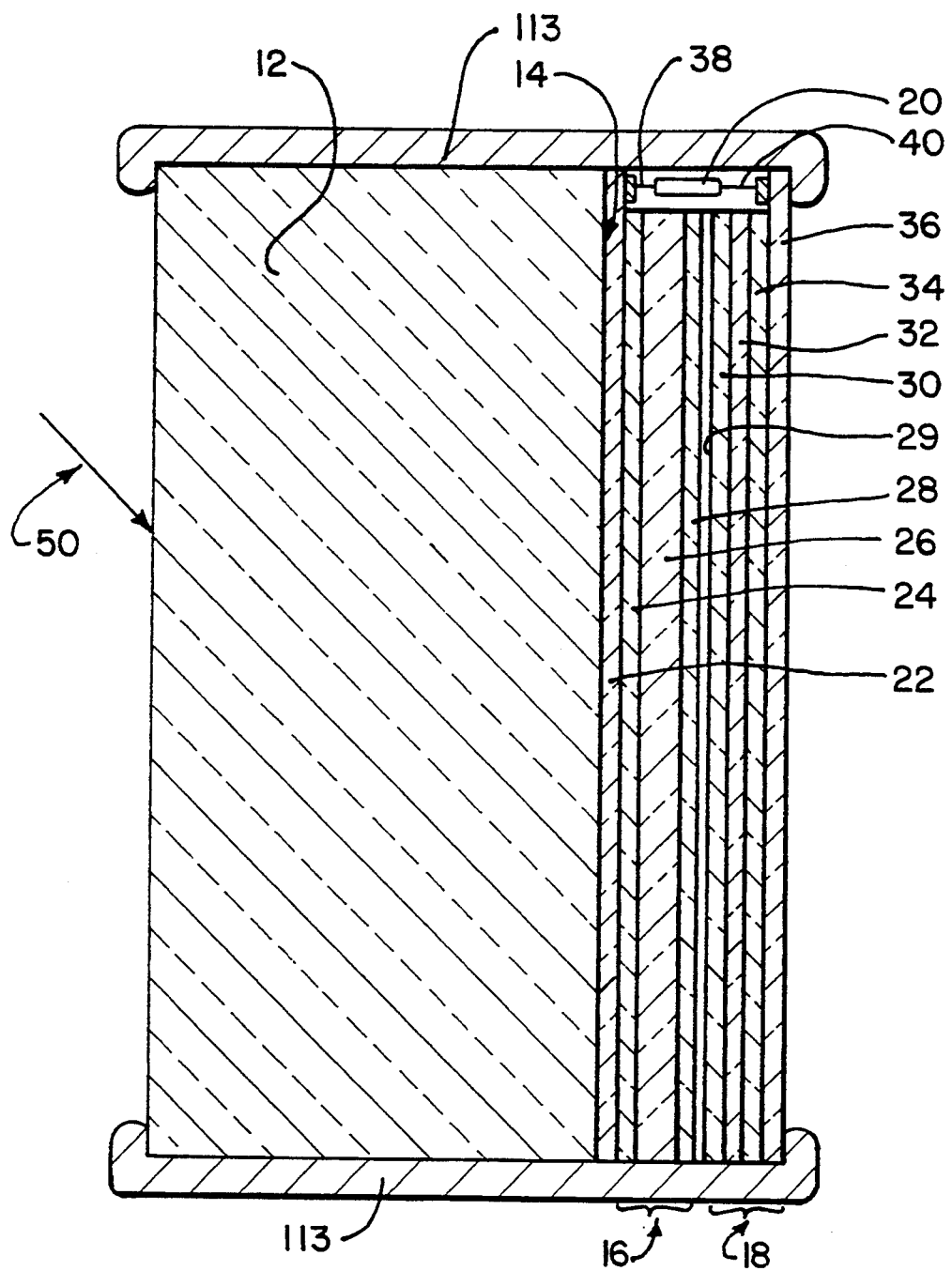
FIG. 3 is a cross-sectional view taken along line 2—2 of FIG. 1 showing an alternate embodiment having an electrochromic device and a photovoltaic device with a transparent electrically conductive material interposed.

FIG. 3 shows an alternate embodiment 200 having a transparent, electrically conductive material 29 interposed between the PV device 16 and the EC device 18, and more specifically between the a-SiC:H(n) layer 28 and the EC layer 30. When WO$_3$ is utilized in EC layer 30 poor electrical conductivity between layers 28 and 30 exists. The poor electrical conductivity is likely caused by the rectifying properties of the a-SiC:H-/WO$_3$ junction, and interposing layer 29 allows the current to flow more easily between PV device 16 and EC device 18. The layer 29 may be made of the same materials used in TE layers 22 and 36. If transparent conductive oxides are used, layer 29 can be about 700 to 6,000 angstroms thick, however if thin transparent metal layers are used, layer 29 may be about 50 to 300 angstroms thick.

Leads 38 and 40 originating from bleeder resistor 20 as shown in FIG. 2 are connected respectively to the transparent conducting electrode layers 22 and 36 to provide the electric potential and circuit across the EC device 18, which is necessary to cause the EC device 18 to convert from transparent to opaque and vice versa. Bleed resistor 20 and leads 38 and 40 may be connected integrally by lithography or masking or they may be external, If connected externally, bleeder resistor 20, may be variable, for user control.

Figure 4:
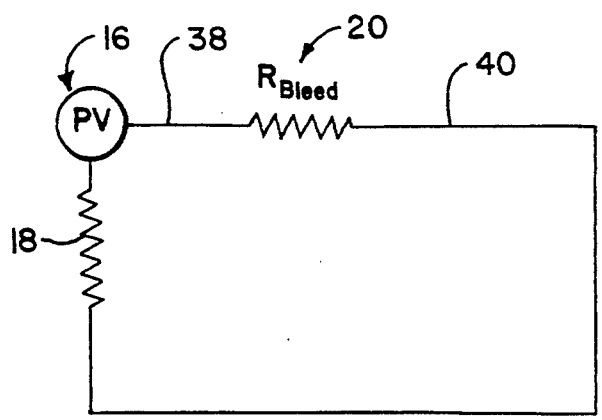
FIG. 4 shows a circuit diagram for an electrochromic device operated by a bleeder resistor and a transparent photovoltaic cell.

In an alternate embodiment (not shown) a battery could be incorporated into the circuit shown in FIG. 4 through an integrated circuit which uses the PV device 16 to sense the ambient lighting. The battery could assist in speeding up the charge or discharge of the electrochromic layer 30, and thus the rate at which the desired light transmittance level is reached.

In operation, the PV device 16 outputs a DC electric current in proportion to the intensity of the sunlight 50 incident upon it. The DC voltage produced by the PV device 16 is then applied between TE layers 22 and 36, through bleeder resistor 20. Ions are extracted from the counter-electrode 34, conducted through the ion-conducting layer 32, and inserted into the electrochromic layer 30, so that the two layers 34 and 30 are simultaneously oxidized and reduced respectively. The value chosen for the resistance of the bleeder resistor 20 takes into account the capacitance presented by the electrochromic layers 30 and 34, and the adjoining solid electrolyte layer 32 and is set to give a bleaching time of about two seconds. In this "on" state, both materials 34 and 30 become more opaque. When the desired light transmittance level or opaqueness is reached, as determined by bleeder resistor 20, the voltage being applied remains steady and the EC device 18, will hold whatever state of opacity or transparency it was in when the predetermined voltage was reached. As the ambient light levels decrease, the bleeder resistor 20 provides a discharge path for the EC device 18, thus removing the voltage or a portion thereof being applied. Ions will be driven back to their original state, thus increasing the transparency of the EC device 18.

Figure 5:
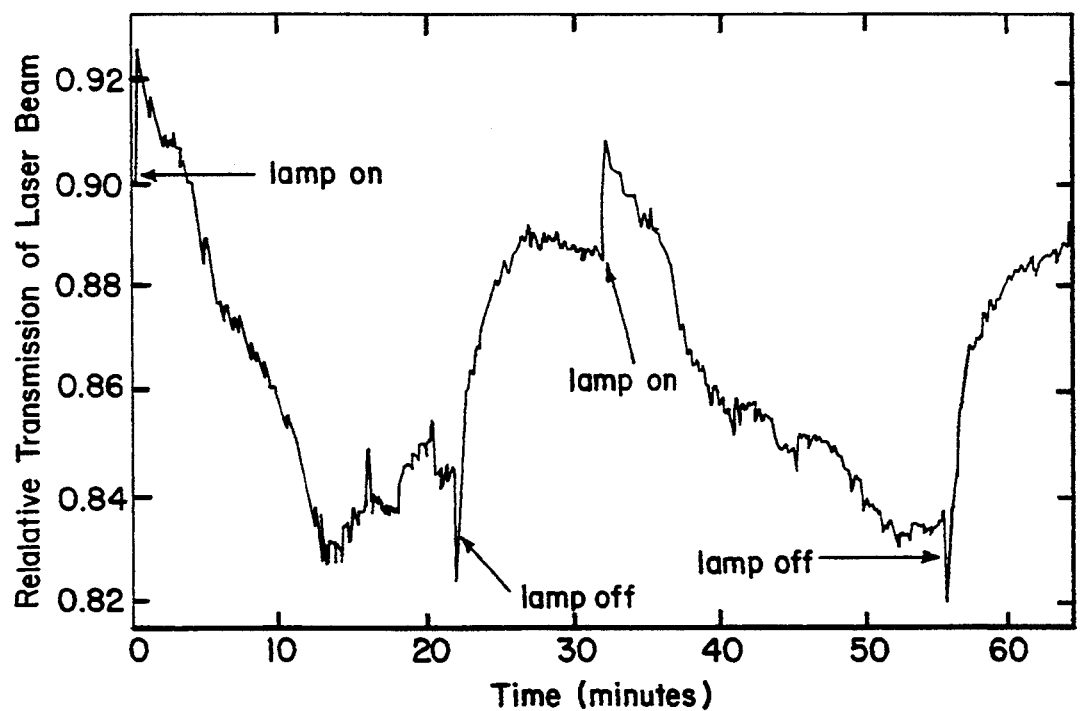
FIG. 5 is a graph of the relative transmittance of a He—Ne laser (6328 Å, red) through the electrochromic-photovoltaic film of the present invention.

The transmittance charge and the current response time of the electrochromic-photovoltaic film can be seen in FIG. 5. The light source is a tungsten-halogen projector lamp (not shown) with an intensity of 1-2 suns, when the lamp is turned on, the transmission of the test laser beam falls almost 10%, and when the lamp is turned off again, the device bleaches and the initial transmittivity is recovered. FIG. 5 demonstrates the response time for changes in transmission of a laser beam through the EC-PV assembly 10 as the laser beam is turned on and off, which demonstrates the principles of this invention. Further improvement of the response time to the order of seconds will be achievable with further refinement of materials, such as wider band gap photocell materials, lithium-based electrochromic materials, and the like, which are not yet available to the inventors.

Figure 1:
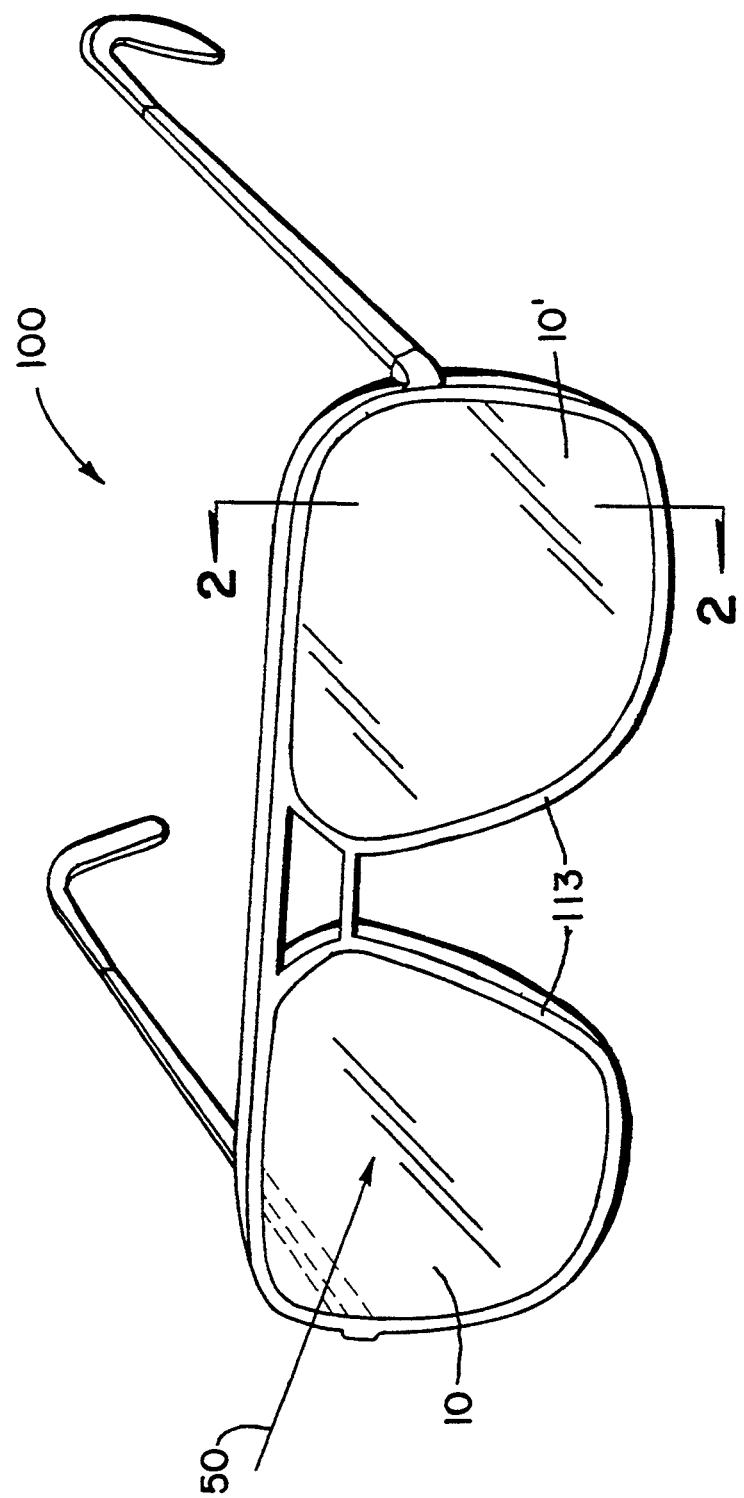
FIG. 1 is a perspective view of the electrochromic-photovoltaic film of the present invention as applied to eyewear.

This fast response time of the present application is well suited for uses where ambient light levels are constantly changing, or where a desired light transmittance level is required almost instantaneously. An example of a field of use which satisfies the above requirements is the eyewear field. Referring now to the drawings, FIG. 1 illustrates a perspective view of the first embodiment 100 of the present invention as applied to eyewear. Eyewear 100 comprises a right and left EC PV assembly 10 and 10' and a framework 113. The EC-PV eyewear 100 is effective at varying the optical transmittance of light, through lenses 10 and 10', dependent upon the intensity of the incident light 50. The fast response time is also ideal for an eyewear user that is coming from a high intensity light situation to a low intensity light situation, such as walking into a dark room from the outside. The EC-PV eyewear 100 will adjust the transmittivity accordingly in a matter of seconds, and the user will not suffer a temporary blindness.

The EC-PV assembly 10 may further be applied to dimmable automobile rearview mirrors. PV device 16 and the EC device 18 can be deposited upon a glass plate which is mirror-reflecting at its surface, when incoming light from an automobile strikes the PV device 16, the EC device 18 darkens accordingly, thus dimming the light which is reflected.

The EC-PV assembly 10 may further be applied to building windows or auto sunroofs.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. A variable transmittance device comprising:
   a transparent substrate having a surface;
   a first layer of electrically conductive material deposited on said surface;
   electrochromic-photovoltaic means deposited on said first layer of electrically conductive material said electrochromic-photovoltaic means includes a photovoltaic electric field producing means that absorbs incident light to produce an electric field and an electrochromic opacity varying means for varying effective radiation transmittance of said substrate in response to said electric field said photovoltaic means and said electrochromic opacity varying means being stacked one over the other on said first layer of electrically conductive material;

second layer of electrically conductive material deposited on said electrochromic-photovoltaic means; and resistor means connected to said first layer of electrically conductive material and to said second layer of electrically conductive material in such a manner that an electric field produced by said photovoltaic means is applied across said electrochromic opacity varying means to vary the effective light transmittance of said transparent substrate.

2. The variable optical transmittance device of claim 1, wherein said transparent substrate comprises glass.

3. The variable optical transmittance device of claim 1, wherein said photovoltaic electric field producing means is deposited on said first layer of electrically conductive material.

4. The variable optical transmittance device of claim 1, wherein said electrochromic opacity varying means is deposited on said first layer of electrically conductive material.

5. The variable optical transmittance device of claim 4, wherein said photovoltaic electric field producing means is deposited over said electrochromic opacity varying means.

6. The variable optical transmittance device of claim 1, wherein said photovoltaic electric field producing means has a wide band gap resulting in said photovoltaic electric field producing means being transparent.

7. The variable optical transmittance device of claim 1, wherein said photovoltaic electric field producing means includes a photo-sensitive semiconductor device that produces electric field in response to irradiation by light energy.

8. The variable optical transmittance device of claim 7, wherein said electrochromic opacity varying means is deposited over said photovoltaic electric field producing means.

9. The variable optical transmittance device of claim 1, wherein said electrochromic opacity varying means includes a layer of electrochromic materials, and a layer of electrolyte material, said electrochromic opacity varying means and said photovoltaic electric field producing means being sandwiched between said first and second layers of electrically conductive material and said resistor means being connected to said first and second layers of electrically conductive material in a manner that allows an electric field to be applied across said electrochromic and ion storage layers, upon reaching a predetermined voltage.

10. The variable optical transmittance device of claim 9, wherein said electrochromic opacity varying means includes a layer of another electrochromic material positioned between said first layer of electrically conductive material and said photovoltaic electric field producing means and with said electrolyte layer positioned between said electrochromic layers, said electrochromic layers being complementary to each other in that one of the electrochromic coating layers becomes opaque in a chemically reduced state and the other electrochromic layer becomes opaque in a chemically oxidized state.

11. The variable optical transmittance device of claim 10, wherein a layer of gold is sandwiched between said photovoltaic electric field producing means and said electrochromic opacity varying means in a manner that enhances the electrical conductivity between said photovoltaic electric field producing means and said electrochromic opacity varying means.

12. The variable optical transmittance device of claim 1, wherein said resistor means has a set predetermined value and when said photovoltaic electric field producing means is inactive current will discharge from said electrochromic opacity varying means through said resistor.

13. The variable optical transmittance device of claim 1, wherein said transparent substrate is an optical lens for eyewear.

14. Eyewear having variable optical transmittance comprising:

a lens having a surface;

first layer of electrically conductive material, wherein said first layer is deposited over said surface of said lens;

electrochromic-photovoltaic means deposited on said first layer of electrically conductive material wherein said electrochromic-photovoltaic opacity varying means includes a photovoltaic electric field producing means that absorbs incident light to produce an electric field and an electrochromic opacity varying means for varying effective radiation transmittance of said lens in response to said electric field;

second layer of electrically conductive material deposited on said electrochromic-photovoltaic means; and resistor means connected to said photovoltaic electric field producing means and to said electrochromic opacity varying means for applying an electric field across said electrochromic opacity varying means and thereby to vary the effective transmittance of said lens.

15. The variable optical transmittance device of claim 14, wherein said photovoltaic electric field producing means is deposited over the surface of said lens.

16. The variable optical transmittance device of claim 15, wherein said electrochromic opacity varying means is deposited over said photovoltaic electric field producing means.

17. The variable optical transmittance device of claim 14, wherein said electrochromic opacity varying means is deposited over the surface of said lens.

18. The variable optical transmittance device of claim 17, wherein said photovoltaic electric field producing means is deposited over said electrochromic opacity varying means.

19. A variable optical transmittance device comprising:

a transparent substrate having a surface;

photovoltaic electric field producing means supported by said substrate for producing an electric field;

electrochromic opacity varying means also supported by said substrate for varying transmittance of said substrate;

said photovoltaic electric field producing means and said electrochromic opacity varying means being stacked one over the other on said substrate so that light passes through said photovoltaic electric field producing means before reaching said electrochromic opacity varying mean:

a layer of gold interposed between said photovoltaic electric field producing means and said electrochromic opacity varying means in a manner that enhances the electrical conductivity between said photovoltaic electric field producing means and said electrochromic opacity varying means; and resistor means connected to said photovoltaic electric field producing means and to said electrochromic opacity varying means for applying an electric field across said electrochromic opacity varying means and thereby to vary the effective transmittance of said substrate.

* * * * *